United States Patent
Dunn et al.

(10) Patent No.: US 9,476,367 B2
(45) Date of Patent: Oct. 25, 2016

(54) FUEL SYSTEM PROTECTION IN A MULTI-FUEL ENGINE

(71) Applicants: Westport Power Inc., Vancouver (CA); GM Global Technology Operations LLC, Detroit, MI (US)

(72) Inventors: Mark E. Dunn, Vancouver (CA); Craig Marriott, Clawson, MI (US); Ning Wu, Vancouver (CA); Dehong Zhang, Vancouver (CA); Raymond Bzymek, Northville, MI (US); Joshua Cowgill, Hartland, MI (US); Ben Moscherosch, Waterford, MI (US)

(73) Assignees: WESTPORT POWER INC., Vancouver (CA); GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/690,411

(22) Filed: Apr. 18, 2015

(65) Prior Publication Data

US 2016/0010569 A1 Jan. 14, 2016

Related U.S. Application Data

(63) Continuation of application No. PCT/CA2013/050799, filed on Oct. 22, 2013.

(60) Provisional application No. 61/717,602, filed on Oct. 23, 2012.

(51) Int. Cl.
*F02D 19/06* (2006.01)
*F02M 43/00* (2006.01)
(Continued)

(52) U.S. Cl.
CPC ......... *F02D 19/0689* (2013.01); *F02D 19/024* (2013.01); *F02D 19/0642* (2013.01);
(Continued)

(58) Field of Classification Search
CPC . Y02T 10/36; F02D 19/081; F02D 19/0692; F02D 19/0689; F02D 19/0665; F02D 41/0025; F02D 19/084; F02D 19/0655; F02D 19/0694; F02D 19/0647; F02D 19/087; F02D 41/0027; F02D 41/3094; F02D 19/0642; F02D 19/0615; F02D 19/0613; F02D 19/0628; F02D 19/08; F02D 19/0644; F02D 19/0649; F02D 19/0623; F02D 19/0652; F02D 19/105; F02D 19/061; F02D 19/0607; F02D 19/0634; F02D 19/0697; F02M 43/04; F02M 43/00
USPC ................ 123/575, 576, 577, 578, 299, 300
See application file for complete search history.

(56) References Cited

U.S. PATENT DOCUMENTS 6,158,418 A * 12/2000 Brown ................ F02D 19/0631
123/435

(Continued)

FOREIGN PATENT DOCUMENTS

DE 10 2006 056 389 A1 6/2008
DE 10 2007 025 076 A1 12/2008

(Continued)

OTHER PUBLICATIONS

International Search Report and Written Opinion of the International Searching Authority issued on Dec. 17, 2013, in connection with International Application No. PCT/CA2013/050799.

(Continued)

*Primary Examiner* — Sizo Vilakazi
(74) *Attorney, Agent, or Firm* — Seed IP Law Group PLLC

(57) ABSTRACT

A method that protects a direct injection fuel injector in a multi-fuel engine comprises selectively operating the engine with at least one of a directly injected fuel introduced through the direct injection fuel injector and a second fuel. When fuelling the multi-fuel engine with the second fuel, a fuel system protection technique is selectively commanded when one or more adverse conditions, such as the direct injection fuel injector requiring cooling, is determined to exist. The fuel system protection technique comprises (a) suspending fuelling with the second fuel and injecting the directly injected fuel for a first predetermined number of engine cycles, and (b) switching back to fuelling the multi-fuel engine with the second fuel for a second predetermined number of engine cycles. The first and second predetermined number of engine cycles are selected to keep torque disturbances below a predetermined threshold value.

14 Claims, 3 Drawing Sheets

(51) Int. Cl.
  *F02D 19/02* (2006.01)
  *F02D 19/08* (2006.01)
  *F02D 41/00* (2006.01)
  *F02D 41/22* (2006.01)
  *F02D 41/38* (2006.01)

(52) U.S. Cl.
  CPC ......... *F02D19/0692* (2013.01); *F02D 19/081* (2013.01); *F02D 41/008* (2013.01); *F02D 41/0025* (2013.01); *F02D 41/221* (2013.01); *F02M 43/00* (2013.01); *F02D 19/084* (2013.01); *F02D 41/0027* (2013.01); *F02D 2041/389* (2013.01); *Y02T 10/32* (2013.01); *Y02T 10/36* (2013.01); *Y02T 10/40* (2013.01)

(56) References Cited

U.S. PATENT DOCUMENTS

| | | | |
|---|---|---|---|
| 7,832,381 B2* | 11/2010 | Pott | F02D 19/0647 123/27 GE |
| 7,853,397 B2* | 12/2010 | Pott | F02D 19/0605 123/575 |
| 2003/0168037 A1* | 9/2003 | zur Loye | F02B 1/12 123/295 |
| 2006/0075992 A1* | 4/2006 | Akita | F02D 41/3094 123/431 |
| 2008/0017171 A1* | 1/2008 | Stein | F02D 19/12 123/478 |
| 2009/0320774 A1* | 12/2009 | Liebsch | F02D 19/0615 123/41.42 |
| 2012/0004831 A1* | 1/2012 | Miyagawa | F02D 19/12 701/103 |
| 2012/0174891 A1 | 7/2012 | Marriott et al. | |

FOREIGN PATENT DOCUMENTS

| | | |
|---|---|---|
| EP | 1496247 | 1/2005 |
| EP | 1496247 A1 | 1/2005 |
| EP | 1 988 272 A1 | 11/2008 |
| WO | 2008/014265 A2 | 1/2008 |

OTHER PUBLICATIONS

International Preliminary Report on Patentability and Written Opinion of the International Bureau issued on Apr. 28, 2015, in connection with PCT/CA2013/050799.

Extended European Search Report, dated Jun. 28, 2016, for European Application No. 13848907.5-1603/2912293, 9 pages.

* cited by examiner

FUEL SYSTEM PROTECTION IN A MULTI-FUEL ENGINE

CROSS-REFERENCE TO RELATED APPLICATIONS

This application is a continuation of International Application No. PCT/CA2013/050799 having a filing date of Oct. 22, 2013, entitled "Fuel System Protection in a Multi-Fuel Engine", which is related to and claims priority benefits from U.S. provisional patent application No. 61/717,602 filed on Oct. 23, 2012 also entitled "Fuel System Protection in a Multi-Fuel Engine". This application also claims priority benefits from the '602 application. The '799 international application and the '602 provisional application are each hereby incorporated by reference herein in its entirety.

FIELD OF THE INVENTION

The present application relates to a technique of fuel system protection in a multi-fuel system internal combustion engine that operates in a plurality of fueling modes.

BACKGROUND OF THE INVENTION

Natural gas is employed as an alternative fuel for vehicles to replace conventional liquid fuels like gasoline and diesel. There are a number of factors motivating the use of natural gas, of which, two are cost and emissions. On an energy equivalent basis natural gas is less expensive than petroleum based fuels. The price of crude oil continues to increase as production continues to outpace discoveries of new oil reserves. In contrast, natural gas reserves continue to increase as production lags behind the discovery of new reserves, thus keeping the natural gas prices well below those of oil.

In addition, engines fueled with natural gas produce fewer emissions than engines fueled with either gasoline or diesel. Due to ever more stringent emission standards, engine manufacturers are looking to natural gas to meet these new standards. The refueling infrastructure for natural gas vehicles is not as extensive as that for conventional liquid fuel and this influences adoption of natural gas vehicles especially for consumer automobiles. Access to refueling stations is currently limited to urban areas and main transportation corridors which limits the range of traveling and requires vehicle operators to make planned refueling trips. For these reasons natural gas has had greater adoption in the heavy duty diesel trucking industry since these vehicles typically operate along the natural gas corridor and/or use private refueling facilities.

Nevertheless, due to the above factors, automobile manufacturers are beginning to integrate natural gas fuel systems alongside existing gasoline fuel systems and to adapt internal combustion engines to be fueled with more than one fuel, these being referred to as "multi-fuel engines". Here, the terms "natural gas" and "gas" are used interchangeably and understood to be preferred examples of a gaseous fuel, but that other gaseous fuels such as ethane, methane, propane, biogas, landfill gas, dimethyl ether, hydrogen and mixtures thereof could also be employed instead of natural gas.

In one such multi-fuel engine there is a direct injection fuel system which introduces liquid fuel directly into combustion chambers, and a natural gas port injection fuel system which introduces natural gas into the intake air upstream of intake valves. In this engine, liquid fuel remains dormant in direct fuel injectors that are not being actuated when operating in a port injection natural gas fueled mode. In this mode, because the nozzles of the direct fuel injectors are located in the combustion chamber, heat from combustion of port injected fuel can elevate the temperature of the liquid fuel inside the direct fuel injectors above a threshold temperature such that the injectors are damaged or carbon deposits begin form. The formation of these carbon deposits leads to fouling of the direct fuel injectors thereby impacting the performance of liquid fuel injection.

In another engine system there are both liquid fuel direct and port fuel injection systems. Depending upon the current operating mode the engine can be fueled with either the direct or port fuel injection system or both simultaneously. The liquid fuel that is used to fuel the engine and delivered to the direct and port fuel injection systems can be the same fuel or different fuels if the engine is a multi-fuel engine. For example, when the engine starts it is advantageous to fuel from the direct injection system in a stratified charge mode, and when under high load or speed the engine can fuel from the port injection system in a premixed mode. Direct fuel injectors can become fouled when liquid fuel remains dormant inside while operating the engine with fuel from the port injection system.

U.S. Pat. No. 7,853,397 issued Dec. 14, 2010 to Pott et al. (the '397 patent), discloses a method of operating an internal combustion engine that operates with a conventional liquid fuel such as gasoline or ethanol, injected through a high pressure direct injector, and with a gaseous fuel such as natural gas or liquefied petroleum gas introduced into the intake air manifold or ports. In gas fuel operation there is the risk that the high pressure direct injectors heat up due to the lack of through-put of liquid fuel and are subsequently damaged or the fuel located inside forms deposits which have an adverse effect on injector behavior. To avoid these problems, a load characteristic of the high pressure fuel injector is determined and if this load is above a limit value then switchover to liquid fuel operation is performed, or liquid fuel operation is hooked into gas operation such that the liquid fuel in the high pressure injector is purged and the injector is cooled. Based on engine temperatures (operating parameters) a thermal load upon the fuel injector is retrieved from a weighing characteristic map, which is integrated over time to determine the load characteristic value. The method of the '397 patent does not determine the temperature of the high pressure injector, but instead determines stored energy representing the empirical thermal load upon the injector. As a result, during gas operation liquid fuel may be consumed unnecessarily based on the stored energy value even though the temperature of the fuel injector is below a critical value above which deposits begin to form. The method of the '397 patents determines the thermal load upon the high pressure injector during gas operation only, and does not continuously determine the thermal load for the full range of fueling modes (gas operation, liquid fuel operation and mixed fuel operation). That is, during gas operation when determined that the thermal load is above the limit value, liquid fuel is flowed through the high pressure fuel injector to purge fuel and cool the injector. The amount of liquid fuel flowed through the injector is based on a predetermined minimum volume, which is expected to cool the injector, instead of the volume required to reduce the temperature of the fuel injector below the critical value at which deposits begin to form. Again, during gas operation, this results in unnecessary and increased liquid fuel operation.

The state of the art lacks techniques for protecting direct injection fuel systems in multi-fuel system engines that reduce or minimize the amount of directly injected fuel that is introduced to protect the direct injection fuel system. Accordingly, for engines that can be fueled through a direct injection system, as well as by means of another fuel system, there is a need for an improved method of protecting the direct injection fuel system when operating with the other fuel system.

SUMMARY OF THE INVENTION

An improved method of protecting a direct injection fuel injector in a multi-fuel engine, the method includes selectively operating the multi-fuel engine with at least one of a directly injected fuel introduced through the direct injection fuel injector and a second fuel; when fueling the multi-fuel engine with the second fuel, selectively commanding a fuel system protection technique when determining that at least one of the direct injection fuel injector requires cooling, an age of directly injected fuel is above a predetermined value, transmission status has changed, an engine shutdown event has occurred and driving pattern recognition predicts an engine shutdown event will occur, wherein the fuel system protection technique comprises (a) suspending fueling with the second fuel and injecting the directly injected fuel for a first predetermined number of engine cycles; (b) switching back to fueling the multi-fuel engine with the second fuel for a second predetermined number of engine cycles; wherein the first and second predetermined number of engine cycles are selected to keep torque disturbances below a predetermined threshold value; and repeating steps (a) and (b) until it is determined that the fuel system protection technique is no longer necessary. In the technique fueling the second fuel to one or more cylinders can be suspended. In a preferred embodiment fueling the second fuel to all the cylinders is suspended. The second fuel can be a second directly injected fuel, or can be a fumigated fuel. The second fuel can comprise at least one of methane and natural gas. The directly injected fuel comprises one of gasoline and ethanol-gasoline blends.

An improved apparatus for protecting a fuel system in a multi-fuel engine comprises a direct fuel injector for introducing a directly injected fuel into a combustion chamber of the multi-fuel engine; a second injector for introducing a second fuel; an electronic controller programmed to selectively operate the multi-fuel engine with at least one of a directly injected fuel introduced through the direct injection fuel injector and a second fuel; when fueling the multi-fuel engine with the second fuel, selectively command a fuel system protection technique when determining that at least one of the direct injection fuel injector requires cooling, an age of directly injected fuel is above a predetermined value, transmission status has changed, an engine shutdown event has occurred and driving pattern recognition predicts an engine shutdown event will occur, wherein the electronic controller commands the fuel system protection technique comprising (a) suspending fueling with the second fuel and injecting the directly injected fuel for a first predetermined number of engine cycles; (b) switching back to fueling the multi-fuel engine with the second fuel for a second predetermined number of engine cycles; wherein the first and second predetermined number of engine cycles are selected to keep torque disturbances below a predetermined threshold value; and repeating steps (a) and (b) until it is determined that the fuel system protection technique is no longer necessary.

DETAILED DESCRIPTION OF PREFERRED EMBODIMENT(S)

Figure 1:
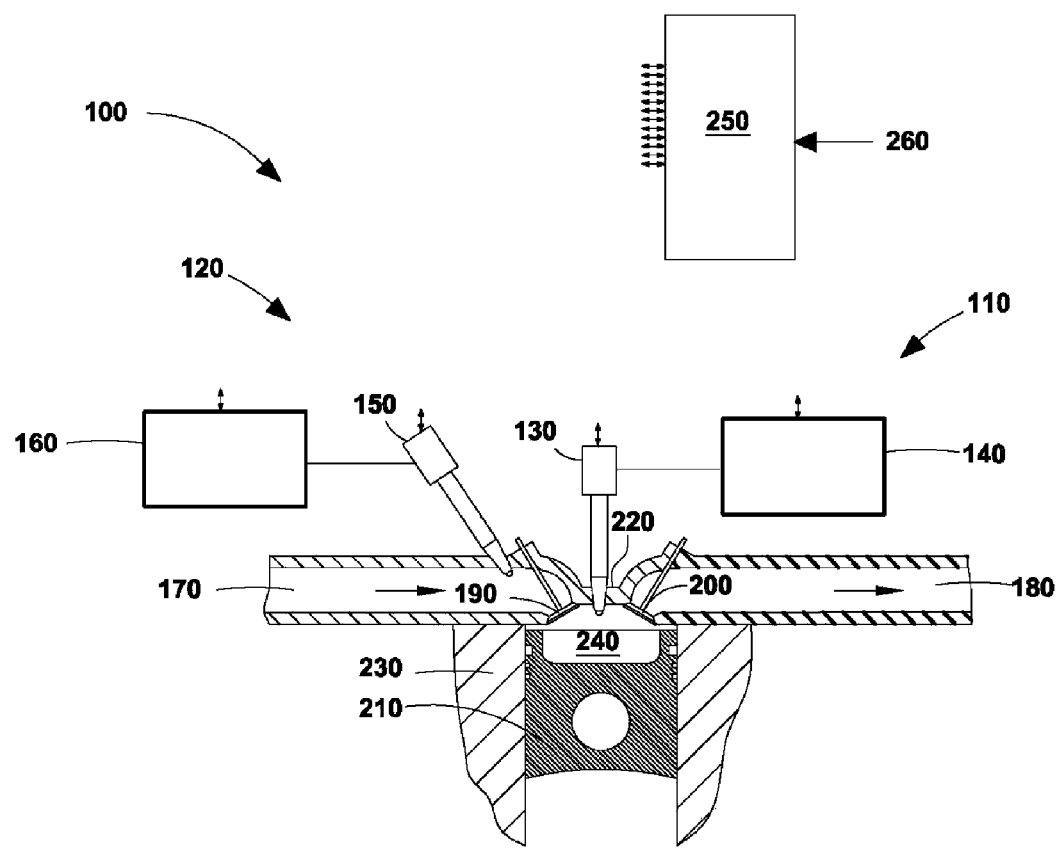
FIG. 1 is a schematic view of an internal combustion engine.

Referring to the schematic view of FIG. 1, internal combustion engine 100 includes direct injection system 110 and fumigation system 120. Direct injection system 110 has at least one direct fuel injector 130 and fuel supply system 140. Direct fuel injector 130 is shown centrally located in cylinder head 220. In some embodiments, cylinder head 220 can be side-mounted in a wall of cylinder block 230. Although only one combustion chamber 240 is illustrated, in typical embodiments there are a plurality of combustion chambers, and for each combustion chamber there is a respective direct fuel injector 130.

Fuel supply system 140 supplies fuel to injector 130 and includes conventional components found in direct injection systems which can vary depending upon whether the directly injected fuel is a liquid fuel or a gaseous fuel. A gaseous fuel is defined as a fuel that is in a gaseous phase at standard temperature and pressure.

Fumigation system 120 uses conventional components to introduce fuel upstream of intake valve 190. In FIG. 1, fumigation system 120 includes at least one port fuel injector 150 and fuel supply system 160. In some embodiments where there is more than one combustion chamber 240, there can be one port fuel injector 150 for each cylinder. In other embodiments one fuel injector, located further upstream in intake manifold 170, can provide fuel for more than one cylinder.

In some embodiments, fumigation system 120 can include conventional components other than fuel injectors for introducing fuel upstream of intake valve 190 such as mixers.

Fuel supply system 160 supplies fuel to injector 150 and includes conventional components found in fumigation systems which can vary depending upon whether the fumigated fuel is a liquid fuel or a gaseous fuel. Engine 100 further includes exhaust manifold 180. For each cylinder there is intake valve 190 and exhaust valve 200. Piston 210 travels within the walls of the cylinder defined by cylinder block 230. Combustion chamber 240 is formed by the space enclosed by the walls of the cylinder, piston 210 and cylinder head 220.

Engine 100 further comprises an ignition source (not shown). In a preferred embodiment, engine 100 is spark ignited. In other embodiments, other conventional ignition sources can be employed depending upon system requirements. Electronic controller 250 communicates with and commands both direct injection system 110 and fumigation system 120 to deliver fuel for combustion in engine 100. Signal wires represented by the symbols with double arrow heads such as those on the left side of electronic controller 250, transmit measured parameters and send command signals for controlling the operation of individual components. Electronic controller 250 can include both hardware and software components. The hardware components can include digital and/or analog electronic components. In the present example electronic controller 250 comprises a processor and memories, including one or more permanent memories, such as FLASH, EEPROM and a hard disk, and a temporary memory, such as SRAM and DRAM, for storing and executing a program.

In another preferred embodiment electronic controller 250 is an engine control unit (ECU) for engine 100. As used herein, controller 250 is also referred to as "the controller". Here, the terms algorithm, module, monitor and step refer to an application specific integrated circuit (ASIC), an electronic circuit, a processor (shared, dedicated, or group) and memory that execute one or more software or firmware programs, a combinational logic circuit, and/or other suitable components that provide the described functionality. In some embodiments the algorithms, modules and steps herein are part of electronic controller 250.

Engine 100 can operate in multiple fueling modes comprising a direct injection mode, a fumigated mode and a co-fueling mode. In the direct injection mode, fuel for combustion in engine 100 is provided by direct injection system 110. In the fumigated mode, fuel for combustion in engine 100 is provided by fumigation system 120. Depending upon engine operating conditions, it is also possible that fuel is provided by direct injection system 120.

In the co-fueling mode, fuel for combustion is simultaneously provided by both direct injection system 110 and fumigation system 120. It is possible that engine 100 operates in a manner that it can selectively switch between these modes on a per cycle basis. Injection timing can be predetermined responsive to engine operating conditions determined from measured parameters that are inputted into electronic controller 250, and the input of such parameters among others is represented by arrow 260.

Figure 2:
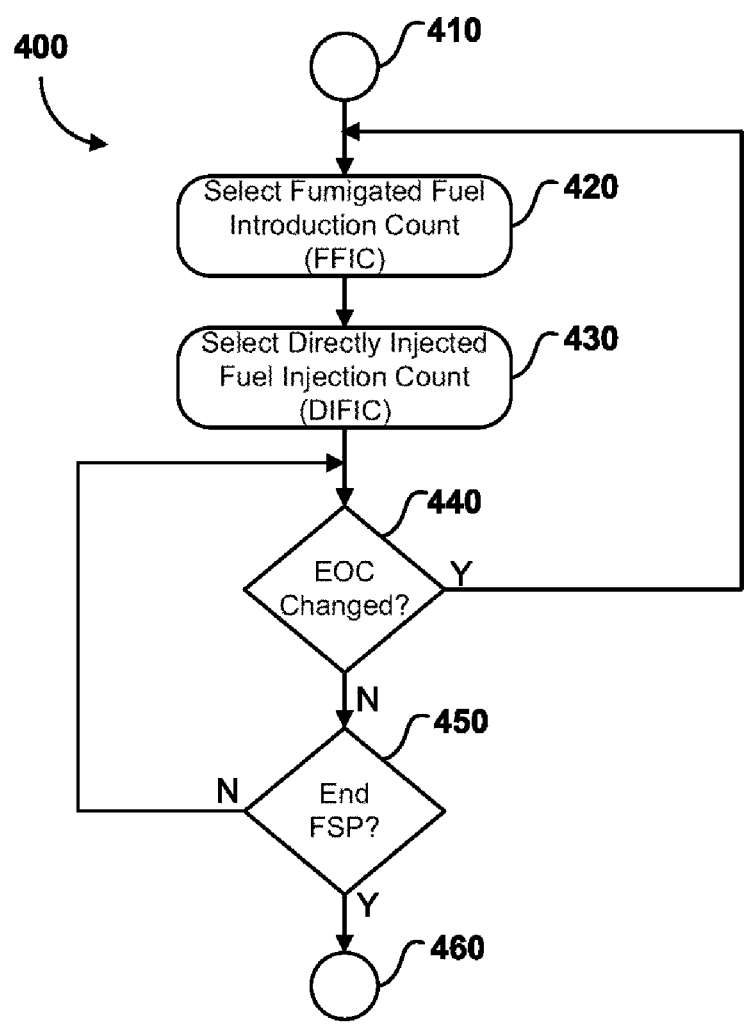
FIG. 2 is a flow chart view of a fuel system protection technique for the internal combustion engine of FIG. 1.

Referring now to FIG. 2, a fuel system protection algorithm that reduces and preferably prevents short term and long term damage to direct fuel injector 130 is shown. Algorithm 400 is entered in step 410 when determined that a fuel system protection technique is required or desirable to protect direct injection system 110. The determination can be made in several ways, for example by employing a temperature model for direct fuel injector 130, by integrating the number of combustion cycles or the time spent in fumigated fuel mode, by engine speed and/or load. The temperature model allows an estimation to be made of the temperature of direct fuel injector 130, which has a direct correlation to both short term and long term damage in the injector. For example, the temperature model can be the one disclosed in co-pending U.S. Provisional Patent Application Ser. No. 61/659,704 filed on Jun. 14, 2012.

It is also possible to perform the fuel system protection technique based on other determinations, such as by a fuel monitor for directly injected fuel in fuel supply system 140, detecting one of a change in transmissions status, an engine shutdown event and driving pattern recognition. The change in transmission status can comprise selection of reverse gear, park, neutral, and in standard transmissions de-clutching. Driving pattern recognition can correlate a certain driving pattern to a shut-down event. For example, employment of a global positioning system (GPS) signal can allow recognition of when the vehicle will be approaching a location where the engine is normally shutdown. This allows proactive measures to be taken to protect direct injection system 110.

The steps of 420 through 460 comprise the fuel system protection technique of fast switching. Fast switching involves rapidly switching cylinders from fueling with fumigated fuel during one engine cycle, to fueling with directly injected fuel on the next engine cycle for a predetermined number of subsequent engine cycles. The fuel source for the cylinders is then switched back to fumigated fuel for another predetermined number of engine cycles before the fast switching cycle repeats. By fast switching the fueling source of the cylinders, directly injected fuel can flow through fuel supply system 140 and through injector 130.

Fumigated fuel introduction count (FFIC) selected in step 420 represents the number of engine cycles in which the engine is fueled from fumigated fuel before fast switching to directly injected fuel. Directly injected fuel injection count (DIFIC) selected in step 430 represents the number injections of directly injected fuel after the fast switch is made. Fast switching begins after the parameters in steps 420 and 430 have been selected.

Normally, a fast switch to directly injected fuel occurs immediately due to the fuel system protection determination in step 410, however this is not a requirement. Directly injected fuel is then injected for the predetermined number of injections (directly injected fuel injection count DIFIC), and then a fast switch is made to introducing fumigated fuel for the predetermined number of engine cycles (fumigated fuel introduction count FFIC), after which the cycle repeats continuously.

Conventionally, in bi-fuel engines when switching from one fuel type to another fuel type the quantities of both fuels are gradually increased and decreased respectively to reduce or minimize torque disturbances. These torque disturbances occur for a variety of reasons. First, when switching from fumigated fuel to directly injected fuel less intake charge is displaced by fumigated fuel resulting in an increase in oxygen within the cylinder. Secondly, when directly injected fuel is introduced during the induction stroke there is a cooling effect on the in-cylinder air charge which increases the density of the air charge thereby again increasing the oxygen concentration in the cylinder. Due to these two reasons, in direct injection modes the amount of oxygen within the cylinder increases for direct injection modes.

When operating in closed loop mode it is advantageous to have the same residual oxygen in each of the cylinders such that the air-fuel ratio (AFR) closed loop control algorithm remains stable. Therefore, with increased oxygen the amount of directly injected fuel should be increased to maintain the residual oxygen at a predetermined level within a range of tolerance. This results in increased heat release rate and indicated torque.

An additional factor influencing torque disturbances is not knowing the heating values of the fuels accurately enough such that the correct amount of either fuel is introduced to consume the same amount of oxygen that was previously consumed by the other fuel type. The problem is increased with fuel blends (for example gasoline and ethanol blends) that have various levels of blending such that the fuel quality or heating value cannot be known accurately beforehand, and with natural gas which is itself a mixture of different gaseous fuel components (for example, methane, ethane, propane, butane), with the heating value varying with different proportions of each component.

In a closed loop fueling system torque disturbances exist when switching from one fuel type to another. Eventually the air handling system can adjust such that the correct amount of oxygen can be introduced into the cylinders such that the torque returns to the desired value. To reduce torque disturbance below a predetermined threshold value with the technique of fast switching, directly injected fuel injection count DIFIC is kept below a predetermined number of engine cycles such that the time spent operating with an elevated torque is reduced. By employing the present technique of fast switching, the engine switches from fumigated fuel to directly injected fuel between two engine cycles, injects directly injected fuel for a predetermined maximum number of engine cycles and switches back to fumigated fuel before the vehicle operator has perceived a torque disturbance. By repeatedly performing this technique enough fuel eventually flows through fuel supply system 140 and injector 130 such that dormant and old fuel is purged and combusted in the engine, and the temperature of injector 130 decreases. The controller monitors engine operating conditions in step 440, and when conditions change control is returned to step 420.

In step 450 the controller determines whether fuel system protection is still required or desirable, and if not the present technique is ended in step 460. The technique of fast switching is beneficial during closed loop AFR control since the two fuel types are mixed less frequently, and for tip temperature control of injector 130 as the technique can rapidly bring down the temperature. When performed to control the tip temperature of injector 130, a temperature profile can be established that resembles a sawtooth pattern, which allows temperature control with a minimal periodic introduction of directly injected fuel.

Figure 3:
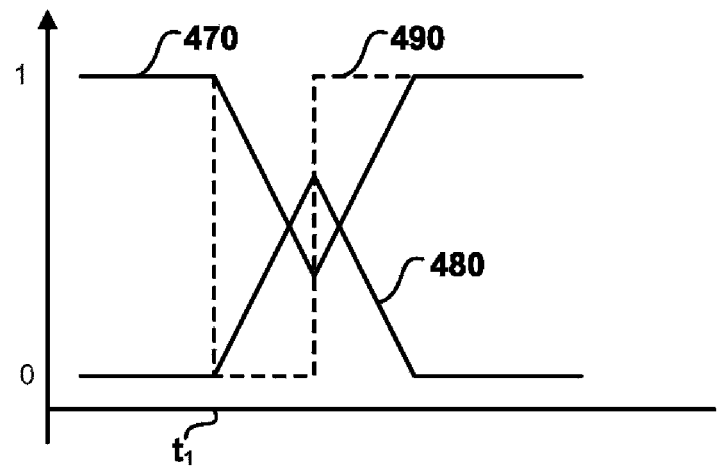
FIG. 3 is a graph of fumigated fuel mass fraction and directly injected fuel mass fraction during a fast switching event for the fuel system protection technique of FIG. 2.

FIG. 3 illustrates a modification to the technique of fast switching which further reduces or minimizes torque disturbances. FIG. 3 shows the mass fraction of fumigated fuel and directly injected fuel during a fast switch. Line 470 represents actual fumigated fuel mass fraction of total fuel consumed by the engine, line 490 represents the commanded fumigated fuel mass fraction and line 480 represents actual directly injected fuel mass fraction. At time $t_1$ the controller commands a fast switch according to line 490, which is then slew rate limited according to line 470. Similarly, directly injected fuel mass fraction is correspondingly slew rate limited. By gradually ramping in and out the two fuel types the air handling system has more time to respond and therefore torque disturbances are reduced.

Figure 4:
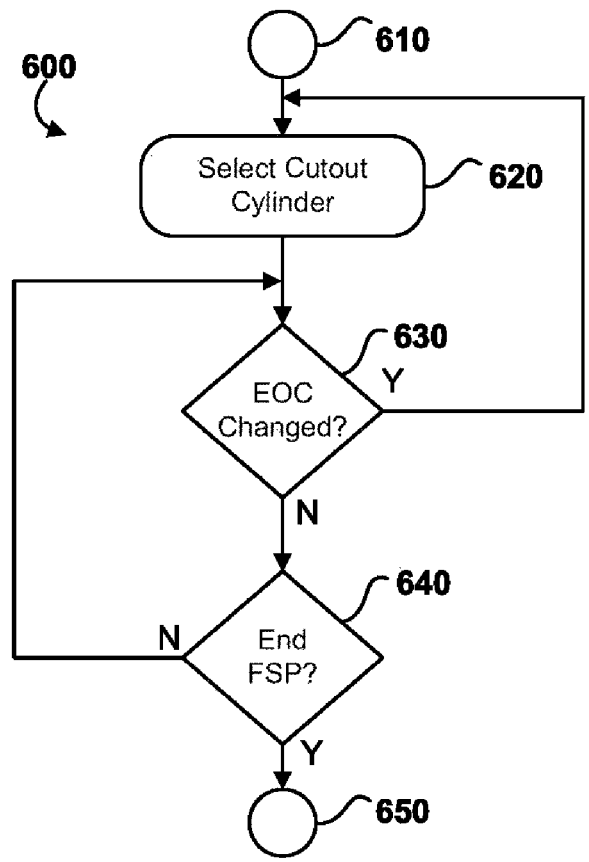
FIG. 4 is a flow chart view of another fuel system protection technique for the internal combustion engine of FIG. 1.

Referring now to FIG. 4, another fuel system protection algorithm that reduces, and preferably prevents, short term and long term damage to direct fuel injector 130 is shown. Algorithm 600 is entered in step 610 when determined that a fuel system protection technique is required to protect direct injection system 110, similar to algorithm 400 in FIG. 2. The steps of 620 through 650 comprise the fuel system protection technique of cylinder cutout. In step 620 a cylinder is selected (the cutout cylinder) in which only directly injected fuel will be introduced, while only fumigated fuel will be introduced in the remaining cylinders. The selection of the cutout cylinder can be made based on load conditions or on regions in the operating map of engine 100. Fumigation system 120 controls the introduction of the fumigated fuel into specific cylinders. In the present embodiment, fumigation system 120 employs port fuel injectors. Actuation of direct fuel injector 130 in the cutout cylinder allows fuel flow through supply system 140 and through injector 130 into this cylinder. After the selection of the cutout cylinder the technique begins. In step 630 when engine operating conditions change control is passed back to step 620 where the cutout cylinder is again selected. It is also possible that the cutout cylinder can be switched in and out of fueling with directly injected fuel only according to engine operating conditions. In step 640 the controller determines whether fuel system protection is still required or desirable, and if not the technique of cylinder cutout ends in step 650. When fumigated fuel is introduced by way of port injectors, the technique of cylinder cutout can be performed when a port injector fails. When the directly injected fuel is petrol and the fumigated fuel is gas, the amount of petrol introduced into the cutout cylinder should be increased on an energy equivalent basis to maintain the same residual oxygen.

The fuel monitor for directly injected fuel is now described in more detail. The fuel monitor tracks the age of directly injected fuel in a fuel vessel in supply system 140. After the fuel in the vessel reaches a predetermined age the likelihood that it will be consumed by engine 100 increases (more co-fueling), independent of the temperature of direct injector 130. The age of the fuel is a function of the time spent in the fuel vessel and the ambient temperature, among other parameters. The fuel monitor tracks the filling and emptying of the fuel vessel, vapor management purging algorithms (when the fuel is a liquid fuel), as well as the ambient temperature and makes a determination of the age of the fuel accordingly. The fuel monitor can also estimate the degradation of directly injected fuel within direct fuel injector 130. The degradation of directly injected fuel in injector 130 is a function of the temperature of the injector. In addition, the fuel monitor can employ a model that estimates the build-up of deposits inside or on the tip of injector 130 based on the injector temperature. Once the fuel inside the injector degrades past a predetermined quality or once deposits build-up past a predetermined amount then the fuel monitor can signal the controller for increased consumption of directly injected fuel. When the signal is due to deposit build-up within or on direct fuel injector 130, the injection pressure for directly injected fuel can be increased to help remove the deposits.

The fuel system protection techniques described in the embodiments of this disclosure can be selectively combined in other embodiments. In the combined algorithms, the different techniques for fuel system protection can be practiced at predetermined regions of the operating map of engine 100, or can be enabled based on other engine operating parameters such as fuel levels or emission levels. The techniques practiced herein are fully compliant with regulations in the full range of fueling modes.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of protecting a direct injection fuel injector in a multi-fuel engine, said method comprising:
   selectively operating said multi-fuel engine with a directly injected fuel introduced through said direct injection fuel injector and a second fuel;
   when fueling said multi-fuel engine with said second fuel, selectively commanding a fuel system protection technique when at least one of the following adverse conditions is determined to exist: said direct injection fuel injector requires cooling, an age of directly injected fuel is above a predetermined value, transmission status has changed, an engine shutdown event has occurred, and driving pattern recognition predicts an engine shutdown event will occur, wherein said fuel system protection technique comprises:
   (a) suspending fueling with said second fuel and injecting said directly injected fuel for a first predetermined number of engine cycles;
   (b) switching back to fueling said multi-fuel engine with said second fuel for a second predetermined number of engine cycles, wherein said first predetermined number and said second predetermined number of engine cycles are selected to keep torque disturbances below a predetermined threshold value.

2. The method of claim 1, further comprising: (c) repeating steps (a) and (b) until said at least one of said adverse conditions is determined to no longer exist.

3. The method of claim 1, wherein fueling with said second fuel is suspended in only one cylinder.

4. The method of claim 1, where said second fuel is a second directly injected fuel.

5. The method of claim 1, wherein said second fuel is a fumigated fuel.

6. The method of claim 1, wherein said second fuel comprises at least one of methane and natural gas.

7. The method of claim 1, wherein said directly injected fuel comprises one of gasoline and ethanol-gasoline blends.

8. An apparatus for protecting a fuel system in a multi-fuel engine comprising:
   a direct fuel injector for introducing a directly injected fuel into a combustion chamber of said multi-fuel engine;
   a second injector for introducing a second fuel;
   an electronic controller programmed to:
      selectively operate said multi-fuel engine with at least one of a directly injected fuel introduced through said direct injection fuel injector and a second fuel;
      when fueling said multi-fuel engine with said second fuel, selectively command a fuel system protection technique when determining that at least one of said direct injection fuel injector requires cooling, an age of directly injected fuel is above a predetermined value, transmission status has changed, an engine shutdown event has occurred and driving pattern recognition predicts an engine shutdown event will occur, wherein said electronic controller commands said fuel system protection technique comprising:
         (a) suspending fueling with said second fuel and injecting said directly injected fuel for a first predetermined number of engine cycles;
         (b) switching back to fueling said multi-fuel engine with said second fuel for a second predetermined number of engine cycles, wherein said first predetermined number and said second predetermined number of engine cycles are selected to keep torque disturbances below a predetermined threshold value.

9. The apparatus of claim 8, said fuel system protection technique further comprising: (c) repeating steps (a) and (b) until said at least one of said adverse conditions is determined to no longer exist.

10. The apparatus of claim 8, wherein fueling with said second fuel is suspended in only one cylinder.

11. The apparatus of claim 8, where said second fuel is a second directly injected fuel.

12. The apparatus of claim 8, wherein said second fuel is a fumigated fuel.

13. The apparatus of claim 8, wherein said second fuel comprises at least one of methane and natural gas.

14. The apparatus of claim 8, wherein said directly injected fuel comprises one of gasoline and ethanol-gasoline blends.

* * * * *